(12) United States Patent
Burov et al.

(10) Patent No.: US 6,242,849 B1
(45) Date of Patent: *Jun. 5, 2001

(54) PIEZOELECTRIC STEP MOTOR

(75) Inventors: Sergey Vyacheslavovich Burov, Arkhangelsk; Jury Vladimirovich Okatov, Severodvinsk, both of (RU)

(73) Assignee: Samsung Electronics Co., Ltd. (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/011,376

(22) PCT Filed: Jun. 5, 1997

(86) PCT No.: PCT/RU97/00178

§ 371 Date: Feb. 4, 1998

§ 102(e) Date: Feb. 4, 1998

(87) PCT Pub. No.: WO97/47077

PCT Pub. Date: Dec. 11, 1997

(30) Foreign Application Priority Data

Jun. 5, 1996 (RU) .................................................. 96111315

(51) Int. Cl.[7] .................................................. H01L 41/08
(52) U.S. Cl. ...................................... 310/328; 310/323.02
(58) Field of Search ...................................... 310/323, 328

(56) References Cited

U.S. PATENT DOCUMENTS

| 5,043,621 | * | 8/1991 | Culp | 310/316 |
| 5,068,566 | * | 11/1991 | Culp | 310/328 |
| 5,136,201 | * | 8/1992 | Culp | 310/328 |
| 5,144,187 | * | 9/1992 | Culp | 310/328 |
| 5,182,484 | * | 1/1993 | Culp | 310/328 |
| 5,241,235 | * | 8/1993 | Culp | 310/328 |
| 5,273,238 | * | 12/1993 | Sato | 244/105 |

FOREIGN PATENT DOCUMENTS

| 0112454 | * | 10/1983 | (EP) . |
| 0360975 | * | 4/1990 | (EP) . |
| 60-002081 | * | 8/1985 | (JP) . |
| 60-082072 | * | 10/1985 | (JP) . |
| 573828 | * | 10/1977 | (SU) . |
| 738016 | * | 5/1980 | (SU) . |

\* cited by examiner

Primary Examiner—Elvin Enad
Assistant Examiner—Peter Medley
(74) Attorney, Agent, or Firm—Piper Marbury Rudnick & Wolfe

(57) ABSTRACT

A piezoelectric stepping motor comprises a cylindrical housing (1), a stator and a rotor (4). The stator comprises at least two rotary-fixing (2) and fixing (3) piezoelectric units which are located one behind the other in a longitudinal plane. The piezoelectric unit (2) comprises a rotary piezoelectric cell (5) and a fixing piezoelectric cell (60, insulators (7) and a friction element (8). The piezoelectric unit (3) comprises a fixing piezoelectric cell (9), insulators (7) and a friction element (8).

9 Claims, 2 Drawing Sheets

PIEZOELECTRIC STEP MOTOR

FIELD OF THE INVENTION

The present invention relates to the field of electric motors and, more specifically, it relates to piezoelectric stepping motors.

BACKGROUND OF THE INVENTION

Known in the art is a piezoelectric stepping motor comprising a power supply unit, a rotor, a stator, driving bimorph piezoelectric cells and fixing elements (SU, A, 769665).

However, in this piezoelectric stepping motor the bimorph piezoelectric cell has insignificant contact with the rotor resulting in nonuniform steps of the angular displacement of the rotor.

Also known in the art is a piezoelectric motor which stator comprises a piezoelectric hollow cylinder having inside a cylindrical rotor frictionally interacting with the stator (SU, A, 573828).

However, this piezoelectric motor operater through the shifting and radial oscillations of the rotor and stator and their frictional interaction, in which case it is impossible to provide uniform angular displacement of the rotor and its accurate positioning.

SUMMARY OF THE INVENTION

The basic object of the present invention is to create a piezoelectric stepping motor which construction would allow to simplify the design and manufacturing technology, to provide a uniform rotation of the rotor and its accurate positioning, as well as reversing.

This object is achieved by providing a piezoelectric stepping motor comprising a housing, a stator in the form of a cylindrical hollow piezoelectric cylinder inside a cylindrical rotor frictionally interacting with the stator, in which motor, according to the invention, the stator comprises at least two rotary-fixing and fixing piezoelectric units, which are disposed inside the housing one behind the other in a longitudinal plane, the rotary-fixing piezoelectric unit comprising a rotary and fixing piezoelectric cells, insulators and a friction element, and the fixing piezoelectric unit comprising a fixing piezoelectric cell, insulators and a friction element, or the stator comprises at least two pairs of piezoelectric units disposed at least in one transversal plane and shaped in the from of sectors.

The housing may be movable, and piezoelectric units may be fixed on the motionless rotor.

The piezoelectric cells may be made in the form of a packet of piezoelectric rings or their sectors which electrodes are connected in parallel alternately, in which case the direction of polarization of each successive piezoelectric ring or sector is opposite to that of the previous one.

The gaps between the piezoelectric units are preferably filled with an elastic insulating material.

The rotor or movable housing may have at least one guide which enters the corresponding guide on the friction elements.

Such constructive embodiment of the claimed stepping motor makes it possible to simplify the design and manufacturing technology of the motor, to increase the uniform rotation of the rotor and its accurate positioning, as well as its reverse.

BRIEF DESCRIPTION OF THE DRAWINGS

The invention is further described by way of example with reference to the accompanying drawings, in which.

THE BEST EMBODIMENTS OF THE INVENTION

Figure 1:
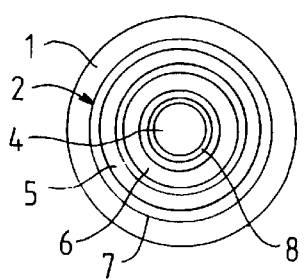
FIG. 1 is a front view of the piezoelectric stepping motor (the first embodiment)
Figure 2:
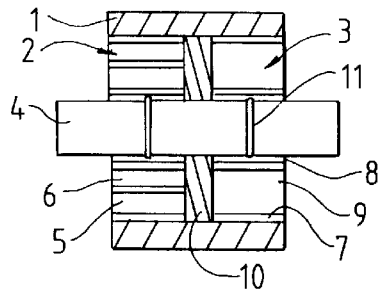
FIG. 2 is a longitudinal section of the motor shown in FIG. 1.

The claimed piezoelectric stepping motor according to the first embodiment of the invention comprises a cylindrical housing 1 (FIG. 1), having inside two piezoelectric units 2 (FIG. 2) and 3 and a cylindrical rotor 4 made in the form of a rod. The piezoelectric units 2 and 3 occupy the space between the cylindrical housing 1 and the rotor 4 and perform the function of a stator, the piezoelectric unit 2 being a rotary-fixing one and piezoelectric unit 3 being a fixing one.

The rotary-fixing piezoelectric unit 2 consists of ring-shaped piezoelectric cells 5 and 6 joined together (e.g. glued), between which cells insulators 7 are disposed. The piezoelectric cell 5 is a rotary one, and the vector of its polarization has a radial direction. The piezoelectric cell 6 is a fixing one. The rotary-fixing piezoelectric unit 2 includes a friction element 8 in the form of a split ring.

The fixing piezoelectric unit 3 consists of a fixing piezoelectric cell 9 which polarization vector has a radial direction, insulators and a friction element 8.

The gaps between the piezoelectric units 2 and 3 are filled with an elastic insulating material 10.

The rotor 4 has guides 11 in the form of a projection to exclude the axial displacement of the rotor 4. These guides 11 enter the corresponding guides (recesses) on the friction elements 8.

Each piezoelectric cell has electrodes connected to wires (these elements are not shown in the drawing).

Other embodiments of the claimed piezoelectric stepping motor are possible.

Figure 3:
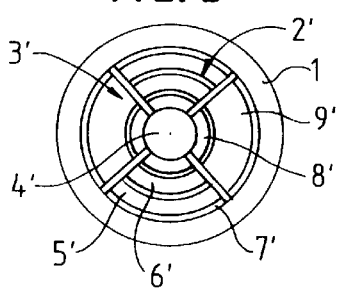
FIG. 3 is a front view of the second embodiment of the motor.
Figure 4:
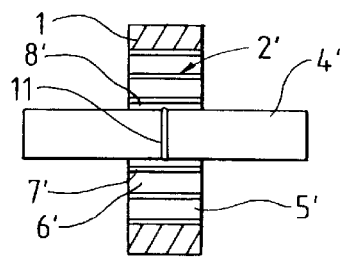
FIG. 4 is a longitudinal section of the motor shown in FIG. 3.

In the second embodiment, in contrast with the first one, piezoelectric units 2' (FIGS. 3 and 4, where characters 2'–9' represent parts analogous to those represented by characters 2–9, respectively, of the first embodiment) and 3' are disposed in one transverse plane and are made in the form of sectors. This allows the size and mass of the motor to be reduced considerably.

Figure 5:
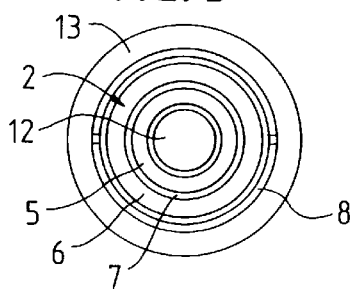
FIG. 5 is a front view of the third embodiment of the motor
Figure 6:
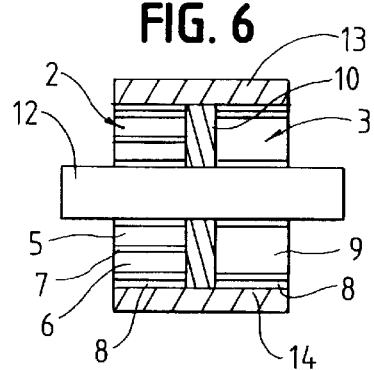
FIG. 6 is a longitudinal section of the motor shown in FIG. 5.

The third embodiment differs from the first one in that the rotor 12 (FIGS. 5 and 6) is stationary while the cylindrical housing 13 rotates, the piezoelectric units 2 and 3 being secured on the rotor 12, and guides 14 being provided on the internal surface of the cylindrical housing 13, that enter the respective guides on the friction elements 8.

Figure 7:
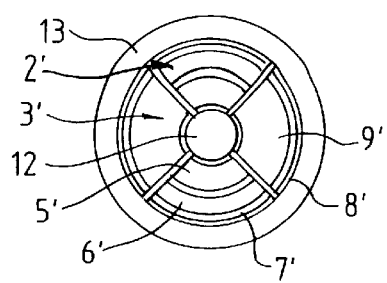
FIG. 7 is a front view of the fourth embodiment of the motor.
Figure 8:
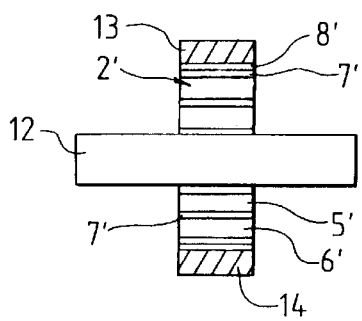
FIG. 8 is a longitudinal section of the motor shown in FIG. 7.

In the fourth embodiment, similar to the second embodiment the rotor 12 is stationary (FIGS. 7 and 8) while the cylindrical housing 13 rotates, and the piezoelectric unit 2' and 3' are disposed in one transverse plane and secured on the rotor 12.

The motor according to invention operates as follows, using the first embodiment by example.

On applying a positive voltage to the electrodes of rotary piezoelectric cell 5 (FIG. 9), the inverse piezoelectric effect results in a shift of its internal part through and angle $\alpha$ counterclockwise relative to the diametral line $A_1 A_2$, in which case the point B located on the internal part of the ring is shifted through an angle $\alpha$ clockwise. When the positive voltage is applied to the fixing piezoelectric cells 6 and 9, they are clamped by means of the rotor 4, and when the negative voltage is applied the piezoelectric cells are pushed apart from the rotor 4 thus releasing it.

The working cycle consists of six time steps.

Figure 9:
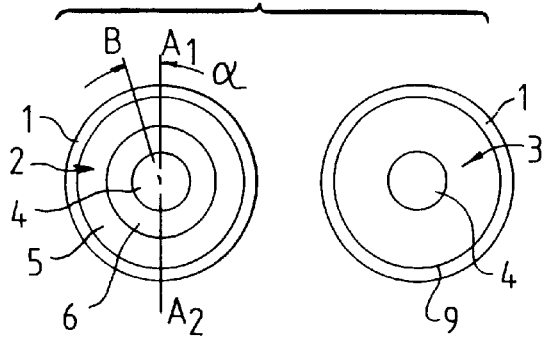
FIG. 9 is the first working time step of the piezoelectric stepping motor, the two cross sections of the rotary-fixing and fixing piezoelectric units, respectively.

The position corresponding to the first time step is shown FIG. 9. The positive voltage is applied to all piezoelectric cells, the rotary piezoelectric cell 5 having its internal part shifted through an angle $\alpha$ counterclockwise and the fixing piezoelectric cells 6 and 9 clamping the rotor 4.

Figure 10:
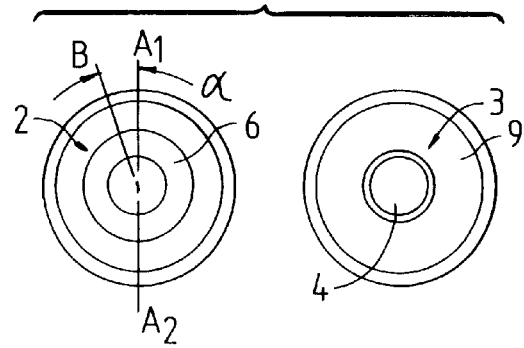
FIGS. 10–14 are the other working time steps of the piezoelectric stepping motor.

In the second time step the piezoelectric unit 2 (FIG. 10) is in the same state while the negative voltage is applied to the fixing piezoelectric cell 9 of the piezoelectric unit 3 and the piezoelectric cell 9 is pushed apart from the rotor 4.

Figure 11:
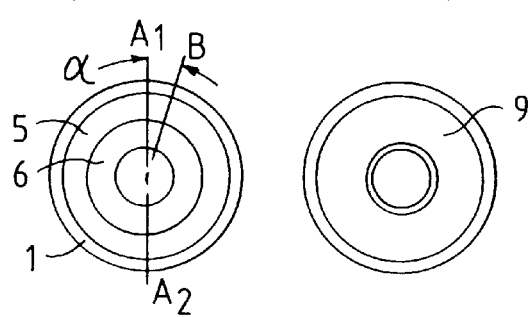

In third time step the negative voltage is applied to the rotary piezoelectric cell 5 (FIG. 11) which turns the fixing piezoelectric cell and the rotor through an angle $2\alpha$ clockwise.

Figure 12:
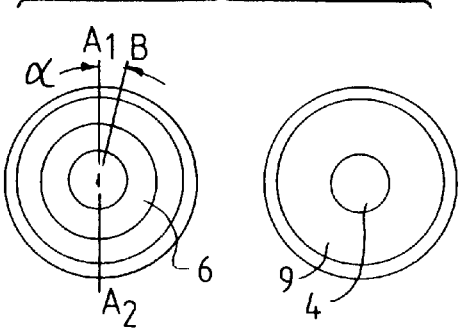

In the fourth time step the positive voltage is applied to the fixing piezoelectric cell 9 (FIG. 12) and it squeezes the rotor 4.

Figure 13:
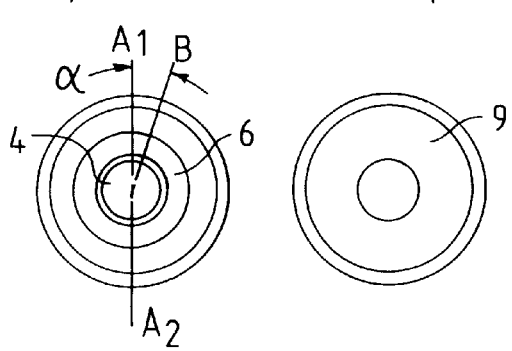

In the fifth time step the negative voltage is applied to the fixing piezoelectric cell 6 (FIG. 13) and it is pushed apart from the rotor 4.

Figure 14:
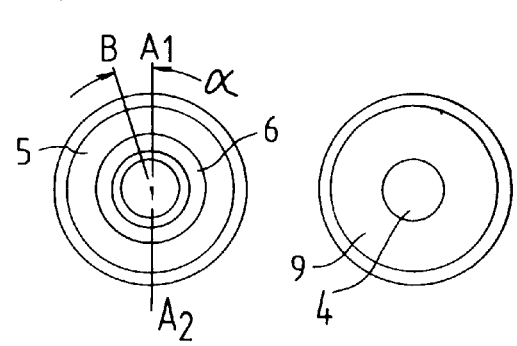

In the sixth time step the positive voltage is applied to the rotary piezoelectric cell 5 (FIG. 14) which displaces the fixing piezoelectric cell 6 through an angle $2\alpha$ counterclockwise.

Then these cycles are repeated, the rotor 4 rotating clockwise.

The reversing motion is performed by changing the sequence in applying the voltage to the fixing piezoelectric cells.

During rotation of the housing 13 (FIGS. 5–8) the working cycle also consists of six time steps but rotary piezoelectric cell and fixing piezoelectric cell exchange places.

To increase the power output the piezoelectric stepping motor may be provided with additional piezoelectric units which may be arranged both in the transverse and longitudinal plane of the motor.

The claimed piezoelectric stepping motor allows to provide a high torque on the rotor, accurate positioning and reversing. A low rotational speed allows to exclude the reduction gear and to use the piezoelectric stepping motor as a direct drive of slave mechanisms.

In the description of the embodiments of the invention, for better understanding, a specific narrow terminology is used. However, the invention is not limited by the accepted terms and one should keep in mind that each such term covers all equivalent terms for the units working in a similar manner and used for the solution of the same technical problems.

Although the present invention is described in connection with preferable type of its realizations, it is clear that changes and modifications may be made without deviation from the idea and scope of the invention and those skilled in the art may easily understand that.

These changes and modifications are considered not extending beyond the essences and scope of the invention and the appended claims.

INDUSTRIAL APPLICABILITY

The invention can be used as a slave mechanism in electrical engineering, telemechanics, radio engineering and automatic systems.

What is claimed is:

1. A piezoelectric stepping motor comprising:
   a) a housing having an inner surface;
   b) first and second cylindrical, hollow piezoelectric units attached to the inner surface of the housing, each of the piezoelectric units being in separate transverse planes, the first piezoelectric unit having a cylindrical rotary piezoelectric cell, a cylindrical fixing piezoelectric cell attached to the rotary piezoelectric cell, and a friction member attached to the fixing piezoelectric cell, the second piezoelectric unit having a cylindrical fixing piezoelectric cell, and a friction member attached to the fixing piezoelectric cell; and
   c) a shaft, which frictionally interacts with at least one friction member, the rotary and fixing cells of the first piezoelectric unit and the fixing cell of the second piezoelectric unit being configured to operate sequentially in order to rotate the shaft.

2. A piezoelectric stepping motor, comprising:
   a) a housing having an inner surface;
   b) first and second sets of cylindrical, hollow piezoelectric sectors attached to the inner surface of the housing, each of the first set of piezoelectric sectors having a rotary piezoelectric cell, a fixing piezoelectric cell attached to the rotary piezoelectric cell, and a friction member attached to the fixing piezoelectric cell, each of the second set of piezoelectric sectors having a fixing piezoelectric cell and a friction member attached to the fixing piezoelectric cell; and
   c) a movable shaft, which frictionally interacts with at least one friction member, the rotary and fixing piezoelectric cells of the first set of piezoelectric sectors and the fixing piezoelectric cells of the second set of piezoelectric sectors being configured to operate sequentially in order to rotate the shaft.

3. The motor of claim 2, wherein the fixing piezoelectric cells are disposed in the first set of piezoelectric sectors between the rotary piezoelectric cells and the shaft.

4. The motor of claim 3, further comprising an insulating material disposed between and separating the piezoelectric sectors.

5. The motor of claim 3, wherein the shaft has at least one guide, and wherein at least one friction member has a guide configured to frictionally interact with at least one of the shaft guides.

6. The motor of claim 2, wherein each of the rotary piezoelectric cells have an inner surface and a rotary polarization vector such that the inner surface of the rotary piezoelectric cells will shift angularly when a voltage is applied to the rotary piezoelectric cells.

7. In a piezoelectric stepping motor having a longitudinal axis, a shaft, a rotary-fixing piezoelectric unit, and a fixing piezoelectric unit, a method of rotating the shaft, comprising the steps of:
- a) frictionally engaging the shaft with the rotary-fixing piezoelectric unit and the fixing piezoelectric unit;
- b) releasing the shaft with the fixing piezoelectric unit, while the rotary-fixing piezoelectric unit remains frictionally engaged to the shaft;
- c) shifting the rotary-fixing piezoelectric unit in an angular direction, thereby rotating the shaft in the angular direction;
- d) frictionally engaging the shaft with the fixing piezoelectric unit;
- e) releasing the shaft with the rotary-fixing piezoelectric unit, while the fixing piezoelectric unit remains frictionally engaged to the shaft; and
- f) shifting the rotary-fixing piezoelectric unit in an angular direction opposite to the angular direction shifted in c); and
- g) repeating steps a) through f) to rotate the shaft in the angular direction shifted in c).

8. The method of claim 7, wherein the rotary-fixing piezoelectric unit comprises a set of rotary-fixing piezoelectric sectors, and wherein the fixing piezoelectric unit comprises a set of fixing piezoelectric sectors.

9. The method of claim 7, wherein the rotary-fixing piezoelectric unit comprises a cylindrical rotary piezoelectric cell and a fixing piezoelectric cell attached to the cylindrical piezoelectric cell, and wherein the fixing piezoelectric unit comprises a cylindrical fixing piezoelectric cell disposed in a different transverse plane than the rotary-fixing piezoelectric unit.

* * * * *